United States Patent
Le et al.

(10) Patent No.: US 12,133,513 B1
(45) Date of Patent: Nov. 5, 2024

(54) AQUACULTURE SYSTEMS WITH BALL VALVE MECHANISMS

(71) Applicant: Tung Le, New South Wales (AU)

(72) Inventors: Tung Le, New South Wales (AU); Quoc Anh Do Nguyen, Pleiku (VN); Thinh Quan Nguyen, Vinh Long Province (VN); Chinh Huu Tran, Khanh Hoa (VN)

(73) Assignee: Tung Le, New South Wales (AU)

( * ) Notice: Subject to any disclaimer, the term of this patent is extended or adjusted under 35 U.S.C. 154(b) by 0 days.

(21) Appl. No.: 18/443,555

(22) Filed: Feb. 16, 2024

(51) Int. Cl.
*A01K 61/59* (2017.01)

(52) U.S. Cl.
CPC .................................... *A01K 61/59* (2017.01)

(58) Field of Classification Search
USPC .......................................... 119/200, 204–214
See application file for complete search history.

(56) References Cited

U.S. PATENT DOCUMENTS

| | | | | |
|---|---|---|---|---|
| 3,025,831 A * | 3/1962 | Berardi | .................. | A01K 61/59 |
| | | | | 210/167.26 |
| 3,682,138 A * | 8/1972 | Day | ....................... | A01K 61/59 |
| | | | | 119/205 |
| 3,727,579 A * | 4/1973 | Lee | ........................ | A01K 63/00 |
| | | | | 119/201 |
| 4,201,153 A * | 5/1980 | Nace | ....................... | A01K 63/00 |
| | | | | 119/224 |
| 4,300,477 A * | 11/1981 | Chapman | ............... | A01K 61/80 |
| | | | | 119/210 |
| 5,873,327 A * | 2/1999 | Holyoak | ................ | A01K 63/00 |
| | | | | 119/416 |
| 6,199,584 B1 * | 3/2001 | Brown | .................... | B05B 15/74 |
| | | | | 137/71 |
| 6,257,170 B1 * | 7/2001 | Gundersen | ........... | A01K 63/003 |
| | | | | 119/245 |
| 2012/0192799 A1 * | 8/2012 | Bazemore, Sr. | ..... | A01K 63/006 |
| | | | | 119/264 |

FOREIGN PATENT DOCUMENTS

| | | |
|---|---|---|
| CN | 202285873 | 7/2012 |
| CN | 104304143 | 1/2015 |
| CN | 105494195 | 4/2016 |
| CN | 210202948 | 3/2020 |
| CN | 109275616 | 2/2021 |
| CN | 215188868 | 12/2021 |
| CN | 112425549 | 4/2022 |

* cited by examiner

*Primary Examiner* — Andrea M Valenti
(74) *Attorney, Agent, or Firm* — Fish & Richardson P.C.; Kim Thien Bui

(57) ABSTRACT

Systems and apparatus for an aquaculture box configured to store water at a water storing stage and to drain water and waste material at a water draining stage are described. In one aspect, the aquaculture box forms an upper end opposite a lower end, where the interior of the aquaculture box comprises one or more drain holes configured to drain water from the aquaculture box. The valve is connected to the first drain hole, where the valve comprises a first drain pipe configured to drain water and waste material from the box during the water draining stage, and a buoyant ball configured to move between the first drain hole and the first drain pipe to prevent water from flowing out of the box during the water storing stage and to detach from the first drain hole and move toward the first drain pipe at the water draining stage.

13 Claims, 8 Drawing Sheets

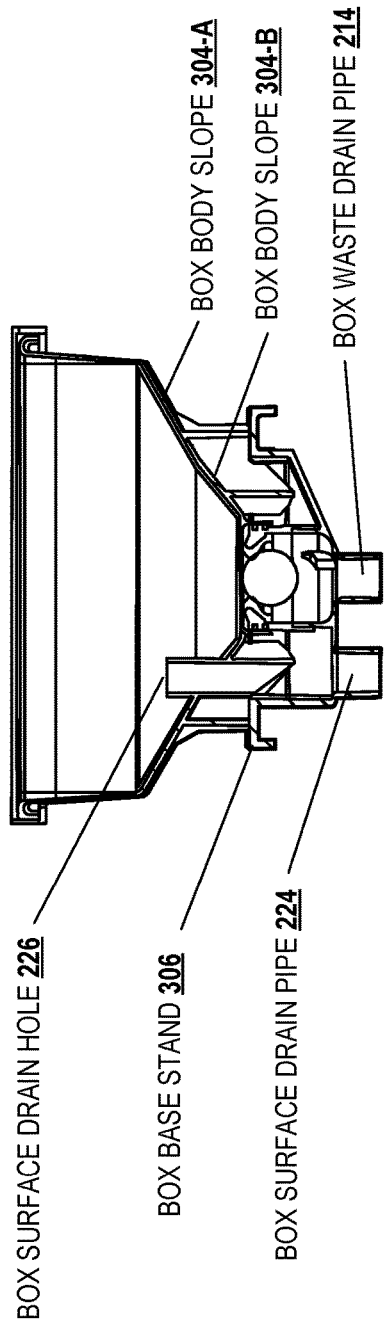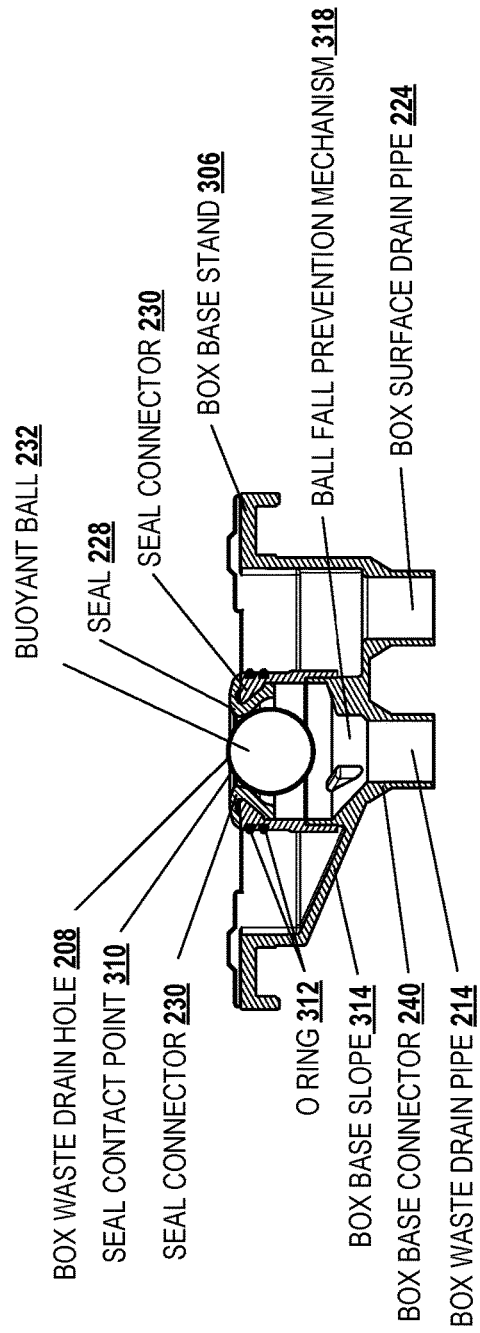
Fig. 3A
Fig. 3B

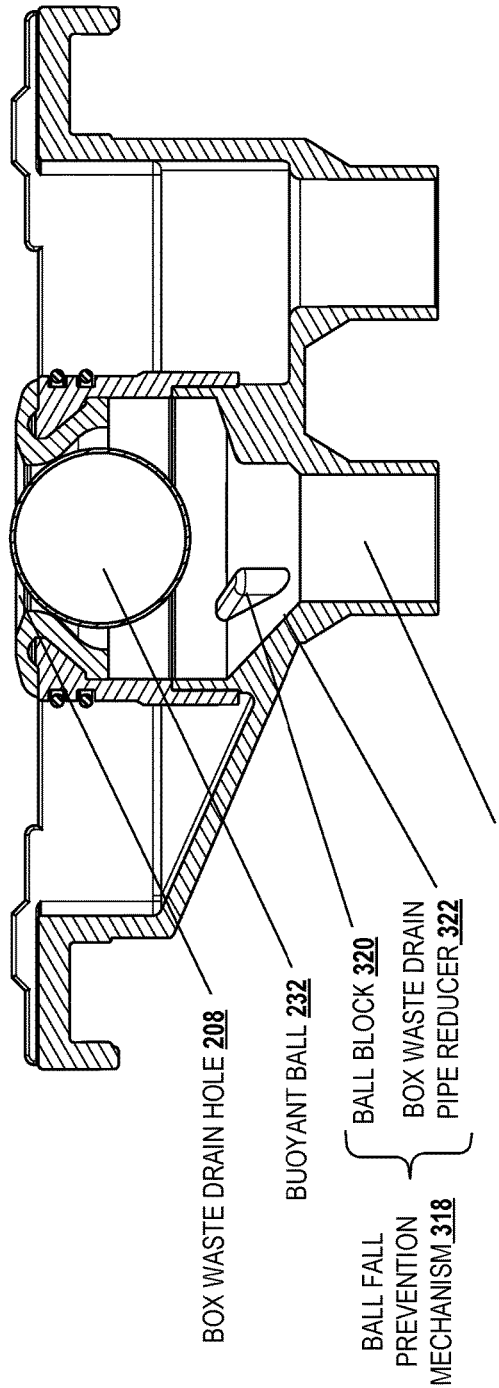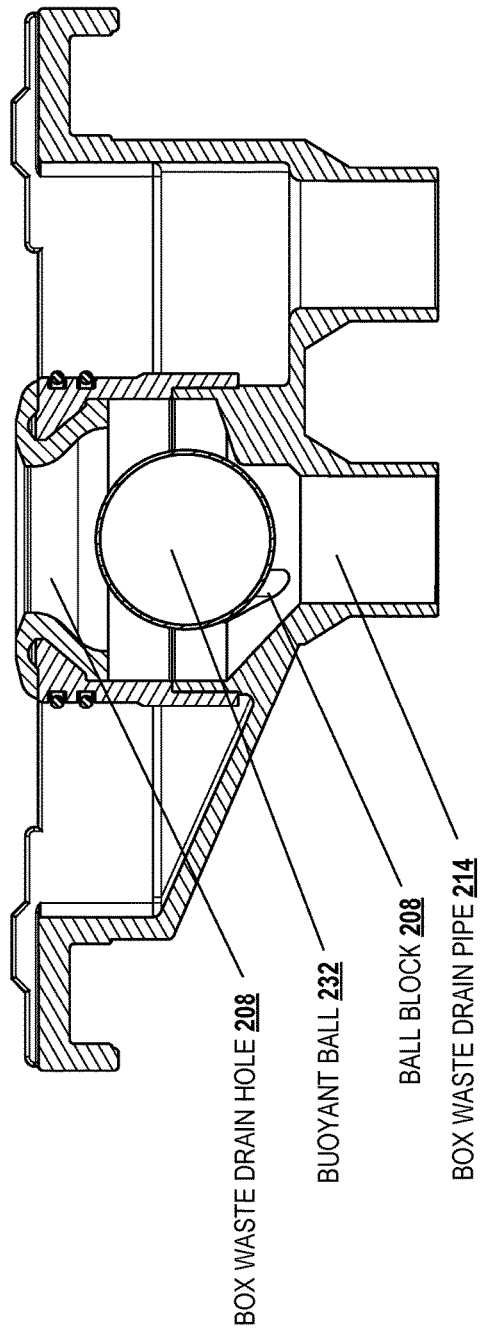
Fig. 3C
Fig. 3D

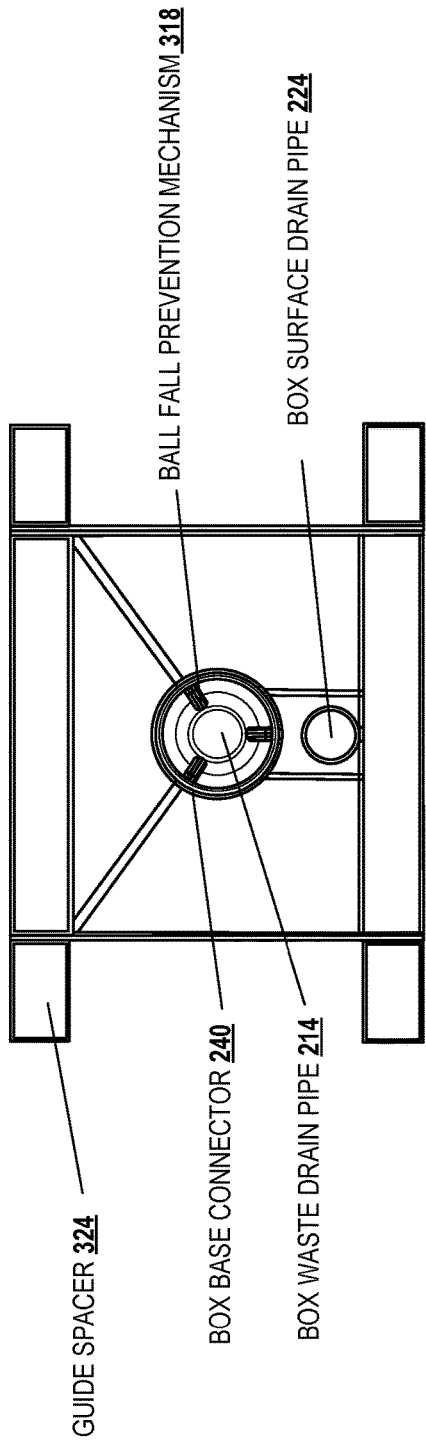
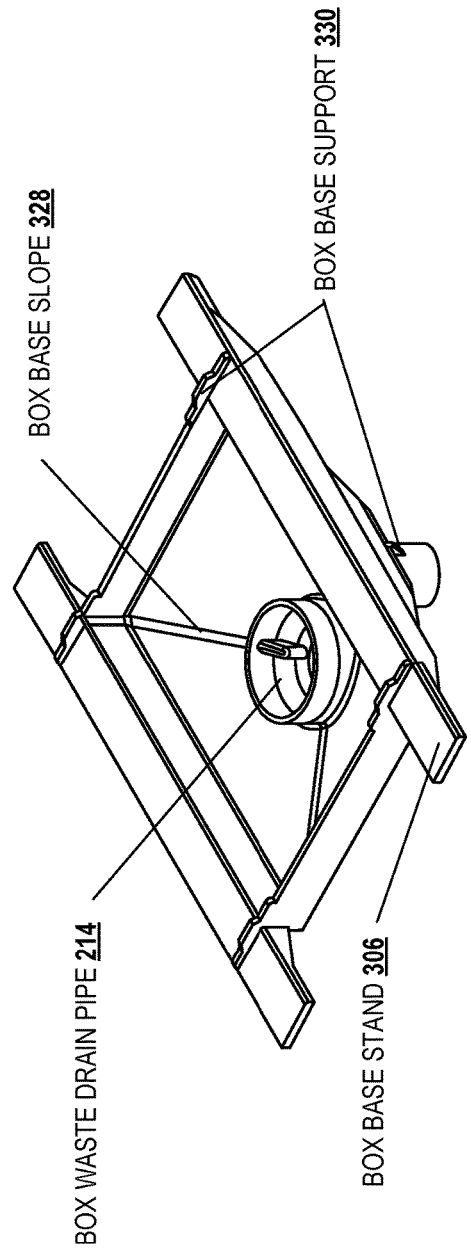
Fig. 3E
Fig. 3F

AQUACULTURE SYSTEMS WITH BALL VALVE MECHANISMS

BACKGROUND

This specification relates to technology for aquaculture.

Aquaculture refers to the breeding, cultivation, and harvesting of aquatic organisms in controlled water environments. It encompasses the entire process of cultivating aquatic products from seedlings under artificial breeding management systems. Recirculating aquaculture systems have been used in aquaculture to enable water conservation and reduced environmental impacts by processing water efficiently for cultivation of aquatic organisms. A recirculating aquaculture system may use one or more aquaculture boxes as cultivators. Aquaculture boxes can serve as the designated space for the survival of cultured aquatic products, and the conditions they offer often play a crucial role in the cultivation process. The quality and output of aquatic products are significantly influenced by the aquaculture boxes, making them a critical component in many cultivation equipment.

SUMMARY

This specification describes an aquaculture system that implements ball valve mechanisms for breeding, cultivation and harvesting of crustaceans.

In general, one innovative aspect of the subject matter described in this specification can be embodied in a device for aquaculture. The device includes an aquaculture box configured to store water at a water storing stage and to drain water and waste material at a water draining stage. The aquaculture box forms an upper end opposite a lower end, where the interior of the aquaculture box includes one or more drain holes configured to drain water from the aquaculture box, a box connector configured to connect a valve to a first drain hole of the one or more drain holes, where the box connector is located at the lower end, the valve connected to the first drain hole through the box connector, where the valve includes a first drain pipe positioned below the first drain hole, wherein the first drain pipe is configured to drain water and waste material from the box during the water draining stage, and a buoyant ball movable between the first drain hole and the first drain pipe, where the buoyant ball is configured to move to the first drain hole and seal the first drain hole to prevent water from flowing out of the box during the water storing stage, and where the buoyant ball is configured to detach from the first drain hole and move toward the first drain pipe at the water draining stage.

Another innovative aspect of the subject matter described in this specification can be embodied in a system for aquaculture. The system includes multiple devices, where each device includes an aquaculture box configured to store water at a water storing stage and to drain water and waste material at a water draining stage. The aquaculture box forms an upper end opposite a lower end, where the interior of the aquaculture box includes one or more drain holes configured to drain water from the aquaculture box, a box connector configured to connect a valve to a first drain hole of the one or more drain holes, where the box connector is located at the lower end, the valve connected to the first drain hole through the box connector, where the valve includes a first drain pipe positioned below the first drain hole, wherein the first drain pipe is configured to drain water and waste material from the box during the water draining stage, and a buoyant ball movable between the first drain hole and the first drain pipe, where the buoyant ball is configured to move to the first drain hole and seal the first drain hole to prevent water from flowing out of the box during the water storing stage, and where the buoyant ball is configured to detach from the first drain hole and move toward the first drain pipe at the water draining stage. The system further includes multiple water delivery pipes configured to deliver water to each of the devices and multiple water collection pipes configured to collect water from each of the devices.

The foregoing and other embodiments can each optionally include one or more of the following features, alone or in combination.

In some implementations, the buoyant ball may seal the first drain hole at the water storing stage based on a water level of water drained from another aquaculture box at the water draining stage of the other aquaculture box.

In some implementations, the lower end is smaller than the upper end, and the upper end and the lower end are connected by at least one inclined angles configured to drain water at the lowest end at the water draining stage.

In some implementations, a crustacean may be harvested in the aquaculture box. The crustacean may be a crab, and food may be supplied to the crab after the water storing stage and prior to the water draining stage.

In some implementations, the aquaculture box may include a cover configured to be placed over the upper end and a cover lock configured to lock the cover over the upper end.

In some implementations, the one or more drain holes may include a second drain hole connected to a second drain pipe. Water in the interior of the aquaculture box may flow out of the second drain hole through the second drain pipe based on a water level of water of the interior of the aquaculture box being higher than the height of the second drain pipe during the water storing stage. The second drain pipe may extend into the interior of the aquaculture box.

In some implementations, the device may include a ball seal located between the first drain hole and the buoyant ball configured to further enable sealing the first drain hole.

In some implementations, the device may include a ball block configured to prevent the buoyant ball from covering the first drain pipe such that waste materials associated with the food can drain from the first drain pipe.

In some implementations, the system may include a waste drain pipe configured to collect water from the water collection pipes, where a set of water collection pipes of the plurality of water collection pipes may be connected to the waste drain pipe by one or more connectors.

In some implementations, the system may include a surface drain pipe configured to collect excess water from the water collection pipes, where a second set of water collection pipes of the plurality of water collection pipes may be connected to the surface drain pipe by one or more connectors. The surface drain pipe is further configured to collect excess water from the water collection pipes based on the positive pressure of the box body of each of the aquaculture boxes.

In some implementations, the multiple devices may be arranged in one or more rows.

Particular embodiments of the subject matter described in this specification can be implemented so as to realize one or more of the following technical advantages.

Conventional recirculating aquaculture systems (RASs) include mechanisms for harvesting crustaceans by circulating water through multiple aquaculture devices of a system, where each device holds a crustacean, such as a crab.

However, current systems do not implement unidirectional water flow through the multiple devices, which can result in disease transmission between devices and inefficient waste removal. Additionally, current systems that use valve mechanisms for water drainage require a system to manually open the valve of each aquaculture device in a system. For example, traditional valves include a ball valve, a butterfly valve, or a knife gate valve, which must increase in size in order to allow the flow of large amounts of water.

In contrast, the system described implements a ball valve mechanism in each aquaculture box to ensure unidirectional water flow. The ball valve mechanism allows a ball to seal a water drain pipe, such that water from another aquaculture box cannot enter the aquaculture box, while allowing waste to flow out of the aquaculture box. Thus, the ball valve mechanism can prevent disease from spreading between aquaculture boxes and the ball valve mechanism can efficiently remove waste. Additionally, the ball valve mechanism retains food during feeding, which improves feeding efficiency, and the shape of the aquaculture box allows for efficient removal of waste by implementing different angles.

In particular, the system uses a single ball valve mechanism to activate the ball valves of each of the aquacultures in the system. For example, to control the water flow of 100 boxes without letting the water flow from one box to another, which can cause the spread of disease, the system allows for each of the ball valves to be opened by a single mechanism, rather than having to open each ball valve for each box manually. Thus, the described system increases water draining efficiency and reduces latency to a fraction of conventional systems that include manually opening the ball valve for each aquaculture box. Additionally, the efficiency of the ball valve mechanism allows for the size of the ball valve mechanism to be relatively small, reducing an amount of material needed for the system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3F are example diagrams of a ball valve mechanism for the aquaculture box.

Like reference numbers and designations in the various drawings indicate like elements.

DETAILED DESCRIPTION

Figure 1:
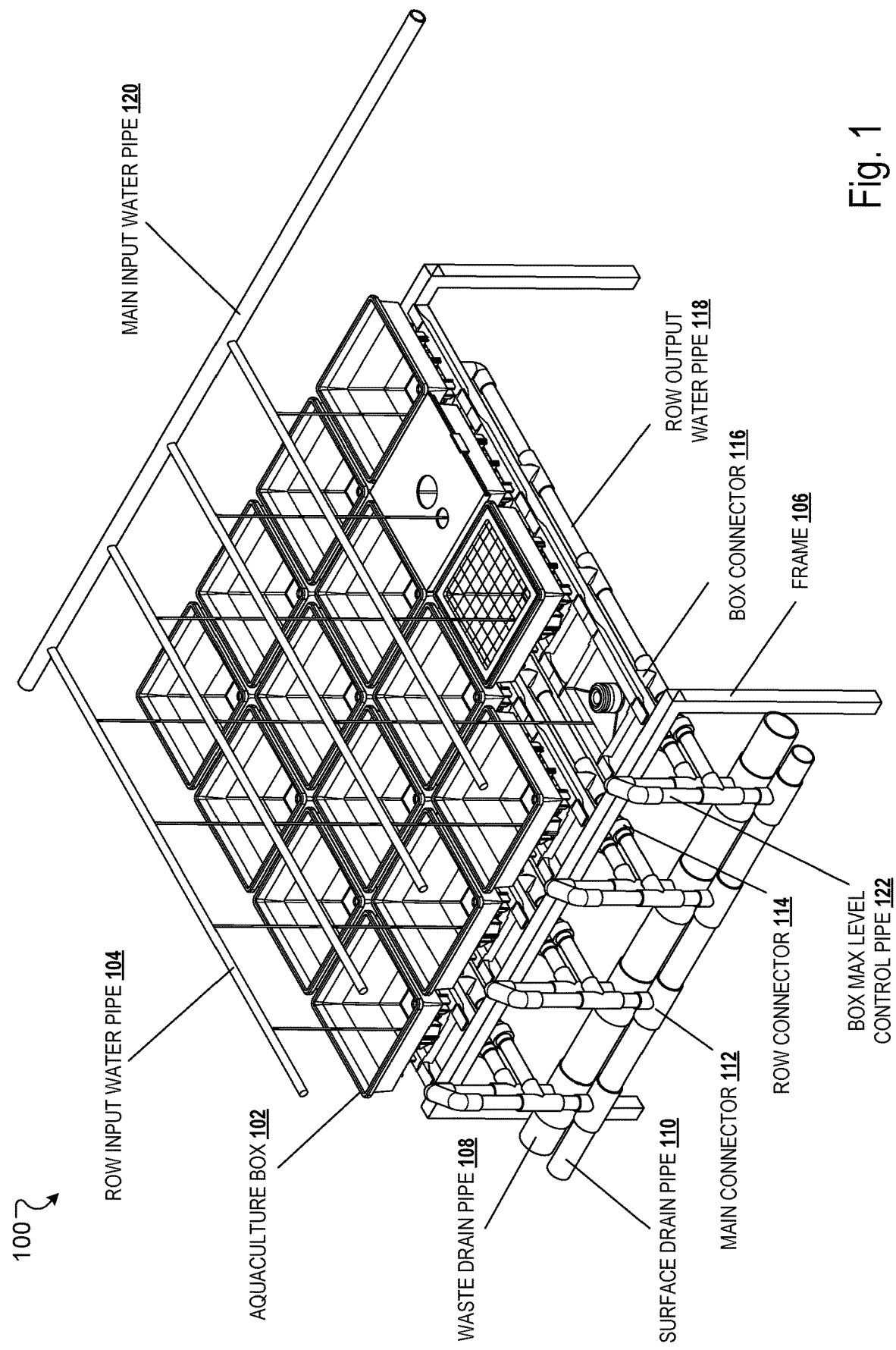
FIG. 1 is a diagram of an example aquaculture system that includes multiple aquaculture boxes.

FIG. 1 shows an example system 100 for aquaculture. The system 100 is an example of an aquaculture system for harvesting crustaceans, such as crabs, giant freshwater prawn, mantis shrimp, lobsters, horseshoe crabs, giant isopods, or Babylonia areolata.

The system is a recirculating aquaculture system that circulates water through multiple aquaculture boxes using a ball check valve mechanism. In particular, the system 100 unidirectionally directs water through the system using a ball valve mechanism in each aquaculture box. For example, harvesting the crabs can include feeding by inputting food into the aquaculture box, such that the water output of the aquaculture box includes waste from the food, resulting in the need for the water to circulate unidirectionally in order to provide clean water to each aquaculture box and to prevent aquaculture boxes from spreading waste or disease to other aquaculture boxes in the system 100.

The system 100 collects the water output of each aquaculture box to recirculate the water through the system 100 after cleaning the water. The system 100 includes multiple aquaculture boxes 102 that each include a box connector 116. Additionally, the system includes a main input water pipe 120, one or more row input water pipes 104, and a frame 106. The frame 106 is configured to support each of the one or more pipes of the system 100. The frame 106 can be made of material to reduce corrosion from saltwater, such as stainless steel aluminum. In some implementations, the system 100 further includes a waste drain pipe 108, a surface drain pipe 110, multiple main connectors 112, multiple row connectors 114, multiple box connectors 116, and multiple row output water pipes 118.

Each aquaculture box 102 is configured to store and drain water for harvesting of one or more crabs. The system 100 can use the main input water pipe 120 to supply water to each of the aquaculture boxes using one or more row input water pipes 104. For example, multiple aquaculture boxes 102 can be arranged in rows, and the system 100 can supply water to each row of aquaculture boxes 102 using the row input water pipe 104 for the particular row.

Additionally, each aquaculture box 102 is connected to a row output water pipe 118 by the box connector 116. For example, each row of the aquaculture boxes 102 can be connected to a same row output water pipe 118 by respective box connectors 116, and the system can drain water from each of the aquaculture boxes 102 to the respective row output water pipe 118 via the box connector 116. In some cases, the row output water pipe 118 can drain water from one or more aquaculture boxes 102 to the waste drain pipe 108, and, in some other cases, the row output water pipe 118 can drain water from one or more aquaculture boxes 102 to the surface drain pipe 110.

The system uses the waste drain pipe 108 and the surface drain pipe 110 to collect the water output of each of the aquaculture boxes 102, where the waste drain pipe 108 and the surface drain pipe 110 are connected to each row of the aquaculture boxes 102 by a main connector 112. The main connector 112 can be a t-shaped connector. In particular, the waste drain pipe 108 can collect water from each of the aquaculture boxes 102 that includes waste (e.g., food spillage), and the surface drain pipe 110 can collect excess water from each of the aquaculture boxes 102 and drain the excess water to a box max level control pipe 122 in order to maintain water equilibrium, as described in further detail below with reference to FIGS. 2 and 3. The surface drain pipe 110 can redirect the water through the system 100. In some cases, the water is treated (e.g., cleaned) prior to reentering the system 100.

The ball valve mechanism (e.g., the ball check valve mechanism) can hold water in the aquaculture box 102 during a water storing stage while preventing water from other aquaculture boxes to enter the aquaculture box, and the ball valve mechanism can drain water and waste from the aquaculture box during a water draining stage. In particular, the aquaculture box 102 includes a box waste drain pipe, where each box waste drain pipe is connected to the waste drain pipe 108 by the box connector 116. In some examples, the aquaculture box further includes a box surface drain pipe that is connected to the surface drain pipe 110 and the box max level control pipe 122 by the box connector 116, as described in further detail with reference to FIGS. 2 and 3.

Thus, the ball valve mechanism prevents food spillage during feeding and acts as a valve during a water draining stage by implementing a water-tight seal mechanism that does not allow water from other aquaculture boxes (e.g., adjacent aquaculture boxes) from entering the aquaculture box 102 during the water storing stage. In particular, the ball valve mechanism includes a buoyant ball that seals a drain hole (e.g., a box waste drain hole) of the aquaculture box 102 during the water storing stage based on a water level (e.g., an amount of water) that is drained from another aquaculture box 102 (e.g., another aquaculture box 102 in the same row). By preventing waste from entering, the ball valve mechanism ensures that the water in each aquaculture box 102 is clean and lessens the probability that the water contains disease, which can improve the water circulation of the system and enhance the harvesting of crustaceans.

Figure 2A:
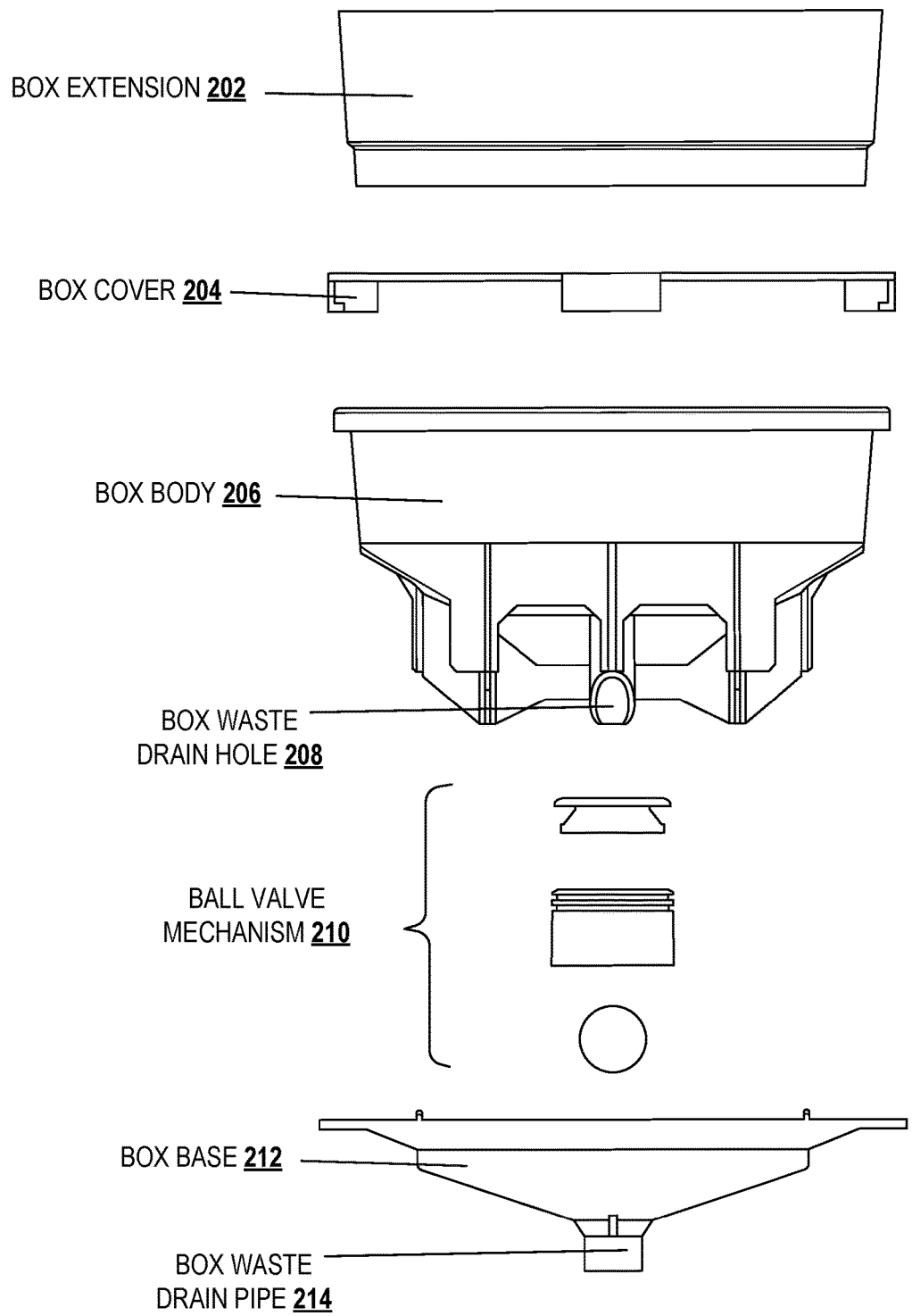
FIGS. 2A-2E are example diagrams of an aquaculture box in the aquaculture system.

FIG. 2A shows a diagram of an example aquaculture box. The aquaculture box is an example of an aquaculture box in which the components and techniques described below are implemented. For example, a system, e.g., the system of FIG. 1, appropriately configured in accordance with this specification, can implement the aquaculture box 102.

As described above, the aquaculture box 102 is used to harvest one or more crustaceans as part of an aquaculture system 100 by using a ball valve mechanism to store and drain water through a box waste drain pipe of the box 102 during a water storing stage and a water draining stage of the system.

The aquaculture box 102 includes a box extension 202, a box cover 204, a box body 206, a box waste drain hole 208, a ball valve mechanism 210, a box base 212, and a box waste drain pipe 214.

The box extension 202 is modifiable, such that the height of the aquaculture box 102 can accommodate various crustacea species. The box cover 204 is configured to cover the aquaculture box 102 to hold a crustacean (e.g., a crab) in the box. In some examples, the box cover 204 can be made from transparent material (e.g., transparent plastic) to allow for observation of the crab.

The box cover 204 can be placed over the box body 206 or over the box extension 202. The box cover is configured to prevent the crab from escaping the aquaculture box 102. The box cover 204 can be made of plastic.

The box body 206 can be shaped to allow for efficient flow of water through the bottom of the box 102. For example, the box body 206 can be rectangular, spherical, cone-shaped, or a combination thereof. In particular, the box body 206 can include one or more slopes in its shape to allow for water to flow downwards and through the box waste drain hole 208 and out of the box waste drain pipe 214 to the waste drain pipe 108 of the system. The box body 206 can be made of plastic. The box body 206 is connected to the box base 212.

The box waste drain hole 208 is a hole in the box body 206 that is configured to allow water, such as water including food waste, to flow out of the box 102 to the box base 212 using the ball valve mechanism 210 while not allowing water from an adjacent aquaculture box 102 to enter through the box waste drain pipe 214.

In particular, during the water storing stage, the ball valve mechanism 210 can seal water from entering through the box waste drain pipe 214, and during the water draining stage, the ball valve mechanism 210 allow water and waste to drain from the box waste drain hole 208 and out of the box waste drain pipe 214, as described in further detail with reference to FIG. 3. The box waste drain pipe 214 can be connected to a row output water pipe 118 of the system by a box connector 116.

Figure 2B:
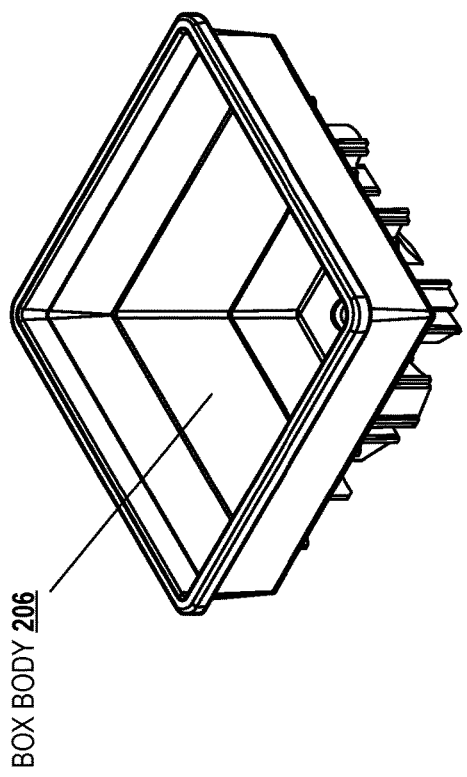

FIG. 2B shows a top view of the box body of an example aquaculture box. The aquaculture box is an example of an aquaculture box in which the components and techniques described below are implemented. For example, a system, e.g., the system of FIG. 1, appropriately configured in accordance with this specification, can implement the aquaculture box 102.

As shown in FIG. 2B, a crustacean can be placed inside of the box body 206 for harvesting prior to the water storing stage and the water draining stage. After the crustacean is placed in the box body 206, the system can supply water to the box body 206 via a row input water pipe during the water storing stage. The crustacean can then be fed. The food can drain to the bottom of the box body 206, and the system can use the ball valve mechanism to allow water, which can include the food waste, to drain out of the box body 206 during the water draining stage, as described in further detail with reference to FIGS. 3 and 4.

Figure 2C:
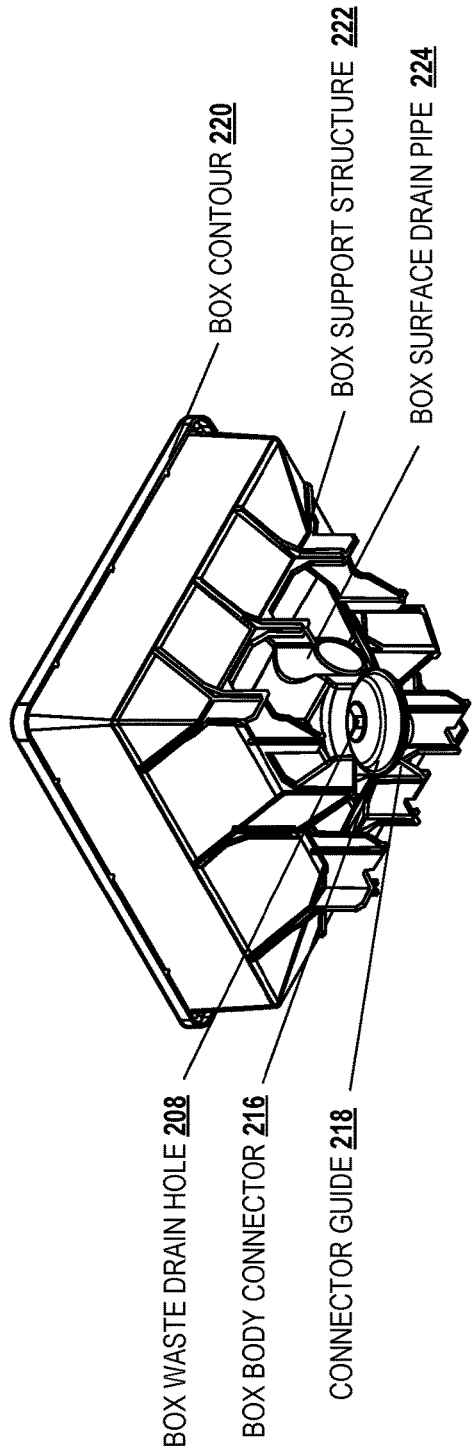

FIG. 2C shows a bottom view of the box body of an example aquaculture box. The aquaculture box is an example of an aquaculture box in which the components and techniques described below are implemented. For example, a system, e.g., the system of FIG. 1, appropriately configured in accordance with this specification, can implement the aquaculture box 102.

During the water storing stage, the system can use the ball valve mechanism 210 to ensure that water from an adjacent aquaculture box 102 does not enter the box body 206 through the box waste drain hole 208 by sealing the box waste drain hole 208. During the water draining stage, the system uses the ball valve mechanism 210 to allow water to flow out of the box body 206 through the box waste drain hole 208.

The box body 206 includes a box body connector 216, a connector guide 218, a box contour 220, a box support structure 222, and a box surface drain pipe 224. The box body connector 216 connects the box body 206 to the box base 212, and the ball valve mechanism 210 can be inside of the box body connector 216. The connector guide 218 ensures that the box body 206 is aligned with the box base 212. The box contour 220 is a ridge along the top of the box body 206. The box contour 220 is configured to allow a person to hold the box body 206, to remove the box body 206 from the box base 212, or both. The box support structure 222 can include one or more supports (e.g., stilts) protruding from the box body 206 that are configured to enable the box body 206 to stand upright. The box support structure 222 can include a box stand that is configured to enable the box body 206 to stand upright on a flat surface.

In some examples, the box surface drain pipe 224 is configured to allow excess water to drain out of the box body 206 based on a water level of the water in the box body 206, as described in further detail below with reference to FIG. 3. In the case where the box 102 does not include the box surface drain pipe 224, the system can drain the water through the box waste drain pipe 214 in order to lower the water level of the water in the box body 206. In particular, the system can leverage the positive flow of the box body 206 to allow the water to drain out of the box 102 in order to prevent spread of disease through the water. In this case, the system can control (e.g., determine) the maximum level of water inside the box body 206 by the height of the box surface drain pipe 224 and the box max level control pipe 122, as the box max level control pipe 122 and the box body 206 function as communicating vessels. In particular, the box max level control pipe 122 can be u-shaped, which results in water draining from the surface drain pipe 224 through the box max level control pipe 122 and to the surface drain pipe 110.

Figure 2E:
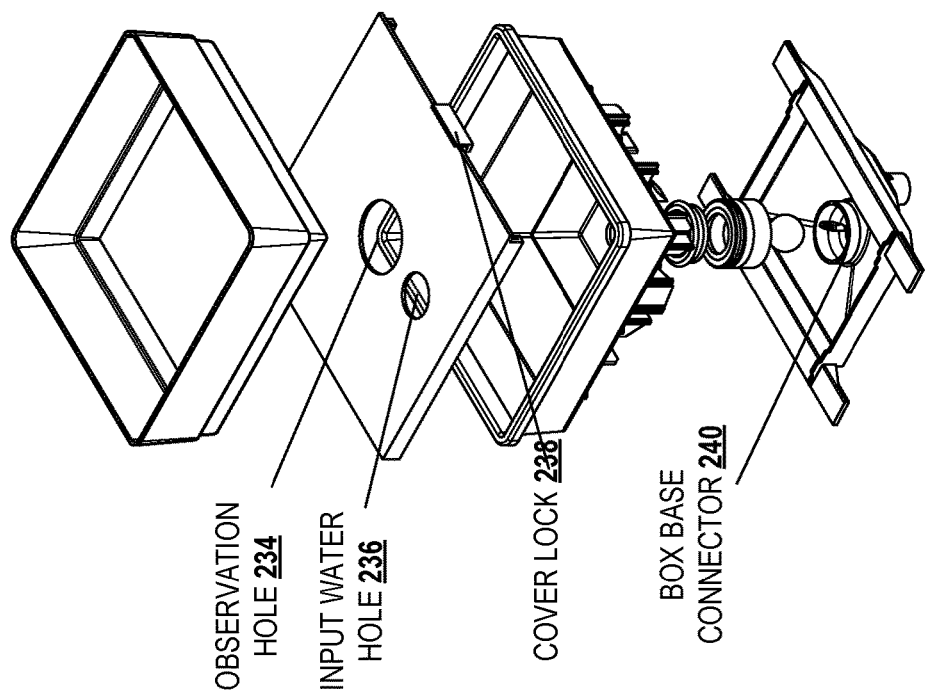
Figure 2D:
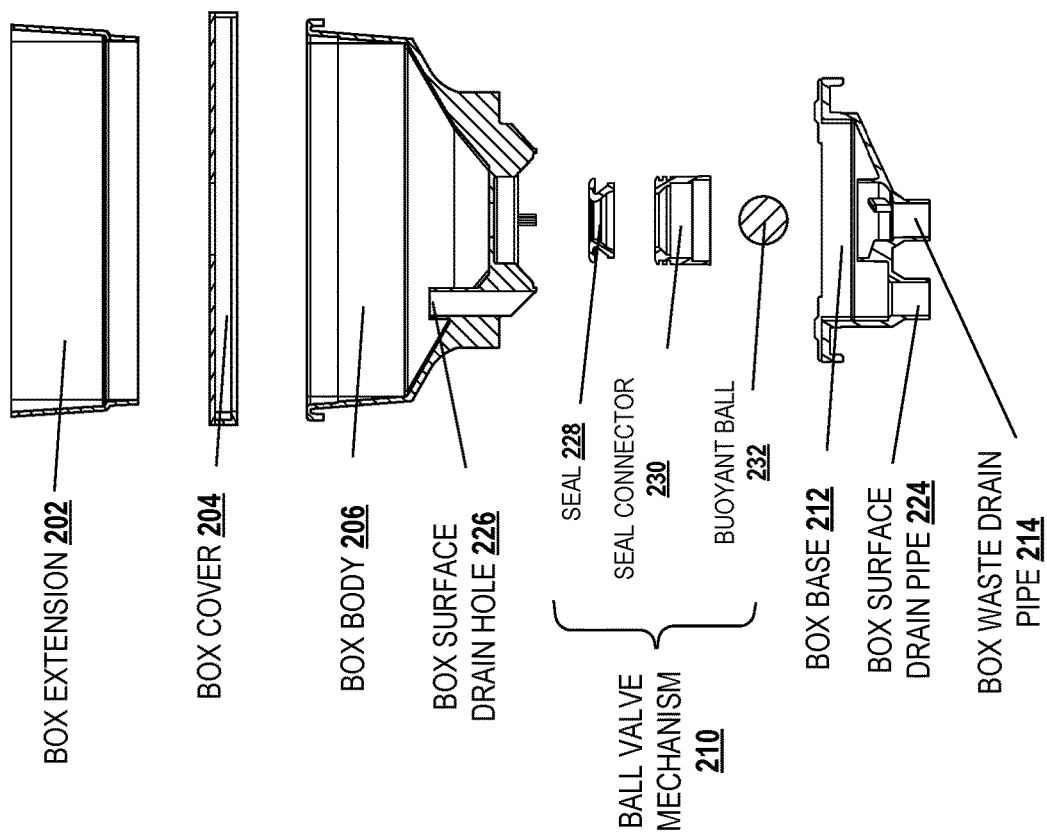

FIG. 2D shows a diagram of an example aquaculture box. The aquaculture box is an example of an aquaculture box in which the components and techniques described below are implemented. For example, a system, e.g., the system of FIG. 1, appropriately configured in accordance with this specification, can implement the aquaculture box 102.

The aquaculture box 102 is configured to store and drain water during a water storing stage and a water draining stage using the ball valve mechanism 210. The ball valve mechanism 210 can include a seal 228, a seal connector 230, and the buoyant ball 232. In particular, the scal 228 is located inside of the seal connector 230, and the seal connector 230 is placed between the box waste drain hole 208 and the box waste drain pipe 214, such that the seal connector 230 is connected to the box base 212 by a box base connector.

The buoyant ball 232 is configured to float in order to seal the aquaculture box 102 by keeping input water inside the box and keeping external water (e.g., water from other aquaculture boxes 102) from entering the box 102. Additionally, the ball valve mechanism allows waste to flow out of the box 102, as the ball 232 does not block the waste from exiting the box 102 through the box waste drain pipe 214, as described in further detail with reference to FIG. 3. In particular, the ball 232 is filled with air, which allows the ball to float. In some other examples, the ball 232 can be made of material that is less dense than water to allow the ball to float. Additionally, the surface of the ball 232 can be made from a particular material such that waste does not stick (e.g., adhere) to the ball 232 and is instead passed through the box waste drain pipe 214.

During the water storing stage, the ball 232 can seal (e.g., lock) water from entering through the box waste drain pipe 214 by being in contact with the seal 228. For example, the seal 228 can be a flexible water-tight seal that can include one or more O-rings to ensure that water cannot enter the aquaculture box, as described in further detail below with reference to FIG. 3. During the water draining stage, the ball can detach from the seal 228 in order to allow water and waste to drain from the box waste drain pipe 214, as described in further detail with reference to FIG. 3.

In some examples, the aquaculture box 102 can include the box surface drain pipe 224 that is connected to a box surface drain hole 226, which is configured to allow excess water to drain out of the box body 206, as described in further detail below with reference to FIG. 3.

FIG. 2E shows an isometric diagram of an example aquaculture box. The aquaculture box is an example of an aquaculture box in which the components and techniques described below are implemented. For example, a system, e.g., the system of FIG. 1, appropriately configured in accordance with this specification, can implement the aquaculture box 102.

In some implementations, the aquaculture box 102 can further include an observation hole 234, an input water hole 239, a cover lock 238, and a box base connector 240.

The box cover 204 can include an observation hole 234 and an input water hole 236. The observation hole 234 can be configured to allow for observation of the crab. In some cases, food can be inserted into the box 102 through the observation hole 234. The input water hole 236 is configured to allow water, such as water from a row input water pipe 104, to enter the aquaculture box 102.

The cover lock 238 connects the box cover 204 to the box body 206. The cover lock 238 is configured to prevent the box cover 204 from being opened from the inside, such that the box cover 204 can only be opened from the outside.

The box base connector 240 is configured to connect with the seal connector 230 to keep the ball in contact with the seal 228 during the water storing stage.

FIG. 3A shows a diagram of an example water draining mechanism for the aquaculture box. The aquaculture box is an example of an aquaculture box in which the components and techniques described below are implemented. For example, a system, e.g., the system of FIG. 1, appropriately configured in accordance with this specification, can implement the water draining mechanism for the aquaculture box 102.

The aquaculture box 102 can further include one or more box slopes 304.

In some examples, the aquaculture box 102 includes the box surface drain pipe 224 configured to control the water level inside the box body 206 in order to prevent the box 102 from overflowing with water. The box surface drain pipe 224 can be any height within the box body 206, and in the case that the box 102 includes the box extension 202, the box surface drain pipe 302 can be extended to be a taller height.

In particular, the box surface drain pipe 224 is configured to keep water in the box body 206 at a particular water level by draining water above the height of the box surface drain pipe 214 through the box surface drain hole 226 during the water storing stage. In this case, the water can flow through the box surface drain hole 226, and the system can collect the excess water at the surface drain pipe 110.

The box body 206 can include one or more box slopes 304, such as box slope 304-A and box slope 304-B, which allow the input water to flow through the through the box waste drain hole 208 and out of the box waste drain pipe 214. In some examples, the box slope 304-A and the box slope 304-B can be of different angles. For example, the box slope 304-B can be more than 60 degrees such that waste (e.g., food) does not stick to the inside of the box and flows out of the box through the box waste drain pipe 214.

The box base stand 306 is connected to the frame 106 of the system. The box base stand 306 is configured to hold the box 102 and to provide support for the structure. The box base stand 306 can be made of stainless steel.

FIG. 3B shows a diagram of an example ball valve mechanism for the aquaculture box. The aquaculture box is an example of an aquaculture box in which the components and techniques described below are implemented. For example, a system, e.g., the system of FIG. 1, appropriately configured in accordance with this specification, can implement the ball valve mechanism for the aquaculture box 102.

The aquaculture box 102 implements the ball valve mechanism using the ball 232 and the seal 228 based on a ball fall prevention mechanism 318. During the water-storing stage, the ball 232 covers the seal 218 such that water from another aquaculture box cannot enter the box 102 through the box waste drain pipe 214 using the ball fall prevention mechanism 318. During the water draining stage, the ball 232 detaches from the seal 228 to allow water and waste to flow out of the box 102 using the ball fall prevention mechanism 318. The ball fall prevention mechanism 318 prevents the ball 232 prevents the ball from falling past a certain point in order to allow water and waste to flow out of the box waste drain pipe 214.

In particular, during the water-storing stage, water from another box can enter the present box 102 through the box waste drain pipe 214 as the other box is in the water draining stage. As the water from the other box enters the box waste drain pipe 214, the ball 232 floats in the water and comes into contact with the seal 228 at seal contact point 310. The seal contact point 310 is the point at which the ball 232 seals the water from entering the box waste drain hole 208 and from entering the box body 206. In particular, in some examples, the seal 228 is configured to change shape by expanding in order to prevent water from entering the box body 206. The seal 228 can be made of silicone, rubber, or a combination thereof. In some examples, the seal 228 includes an O-ring 312 to ensure that the seal 228 is water-tight by being in contact with the seal connector 230.

During the water draining stage, the ball 232 detaches from the seal and moves downward. In this case, the ball fall prevention mechanism 318 prevents the ball from covering box waste drain pipe 214, such that waste and water can flow out of the box 102. The ball fall prevention mechanism 318 can include one or more bended edges, which allow waste to flow freely out of the box waste drain pipe 214.

FIGS. 3C and 3D shows a diagram of an example ball fall prevention mechanism for the aquaculture box. The aquaculture box is an example of an aquaculture box in which the components and techniques described below are implemented. For example, a system, e.g., the system of FIG. 1, appropriately configured in accordance with this specification, can implement the ball valve mechanism for the aquaculture box 102.

The ball valve mechanism 210 controls the motion of the ball 232 using the ball fall prevention mechanism 318, which includes a ball block 320 and a box waste drain pipe reducer 322. The ball block 320 can be an angled ridge protruding from the box waste drain pipe 214 that blocks the ball from falling and completely covering the box waste drain pipe 214. The box waste drain pipe reducer 322 can be located in the box waste drain pipe 214 with a sloping shape. The box waste drain pipe reducer 322 reduces the size of the box waste drain pipe 214 and is configured to efficiently allow for waste to flow out of the box waste drain pipe 214

For example, as shown in FIG. 3C, during a water storing stage, the ball 232 can be floating based on water entering the box 102 through the box waste drain pipe 214. However, the ball 232 blocks the water from entering the box 102 by sealing the box waste drain hole 208. Then, as shown in FIG. 3D, during a water draining stage, the ball 232 can fall downwards towards the box waste drain pipe 214 to allow waste and water to flow out of the box waste drain pipe 214. However, the ball fall prevention mechanism 318 does not allow the ball to completely fall to the box waste drain pipe 214, and thus, the ball fall prevention mechanism 318 is configured to prevent the ball 232 from sealing the box waste drain pipe 214 and to allow for water to drain out of the box 102.

FIG. 3E shows a top view of the box base of an example aquaculture box. The aquaculture box is an example of an aquaculture box in which the components and techniques described below are implemented. For example, a system, e.g., the system of FIG. 1, appropriately configured in accordance with this specification, can implement the aquaculture box 102.

The box base 212 is connected to the box body 206 by the box base connector 240, which includes the ball fall prevention mechanism 318, as described above. Additionally, the box base 212 is connected to the box surface drain pipe 224, which allows excess water to flow out of the box 102, as described above. In some examples, the box base 212 includes a guide spacer 324, which is configured to align spacing between the box body 206 and the box base 212.

FIG. 3F shows an isometric view of the box base of an example aquaculture box. The aquaculture box is an example of an aquaculture box in which the components and techniques described below are implemented. For example, a system, e.g., the system of FIG. 1, appropriately configured in accordance with this specification, can implement the aquaculture box 102.

The box base 212 can have a box base slope 328 configured to allow water to flow out of the box 102 through the box waste drain pipe 214. The box base slope 328 can be a slope of that is less than the slope of the box body shape to allow water and waste to flow through the box 102. The box base 212 can also include the box base stand 306 configured to support the box 102. In some examples, the box base stand 306 includes box base support 330 configured to provide increased support for the box 102 to stand upright and to sustain water weight in the box body 206.

Figure 4:
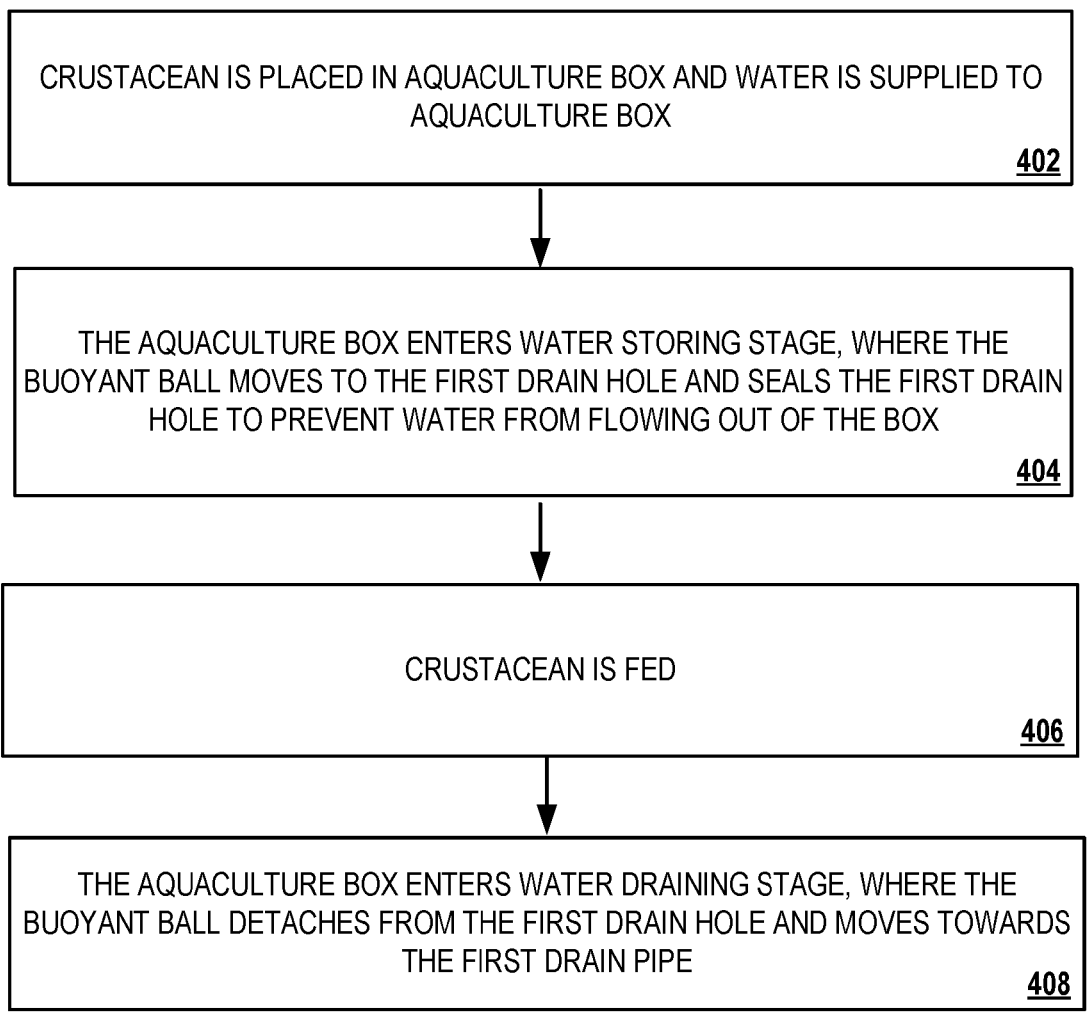
FIG. 4 is a flow diagram of an example process for storing and draining water for the aquaculture box.

FIG. 4 is a flow diagram of an example process for storing and draining water for the aquaculture box.

For each aquaculture box of the system, a crustacean is placed in the aquaculture box, and the system supplies water to the aquaculture box (402). The system can supply water to the aquaculture box using an input water pipe.

During the water storing stage, the buoyant ball of the aquaculture box moves to the first drain hole and seals the first drain hole to prevent water from flowing out of the box (404). The ball seals the box waste drain hole. In particular, the ball prevents water from the box base (e.g., water from another box that may contain waste and/or disease) from entering the box body by coming into contact with the seal.

In some cases, the box can include a surface drain pipe that can control the water level of the box body as input water enters the box. In particular, based on the water level of the box base being higher than the height of the surface drain pipe, water can flow into box surface drain hole and out of the box through the box surface drain pipe. In this way, the box 102 can control the water level of the box, and the system can collect the excess water using the box surface drain pipe.

The crustacean is then fed (404). The food can be put into the box body through the box cover or through the observation hole in the box cover. Once the crustacean has been fed, the waste or the remaining food can flow to the bottom of the box body 206 based on the slopes of the box body 206. After feeding, the system is configured to enter a water draining stage, as keeping the food inside the box body for an extended period of time can lead to disease or pollution of water in the box.

During the water draining stage, the buoyant ball detaches from the first drain hole and moves towards the first drain pipe (406). In particular, the ball detaches from the seal that is covering the first drain pipe, and the ball moves downward towards the box waste drain pipe, allowing water to drain out of the box. The ball fall prevention mechanism (e.g., ball block) ensures that the ball does not cover the box waste drain pipe, such that waste can flow out of the box, and the system can collect the waste in the waste drain pipe. Thus, the system can then clean the water (e.g., remove the waste), and the system can redirect the clean water back into the system, ensuring a unidirectional clean water system for each of the aquaculture boxes.

In some examples, the box can be removed and replaced with another box. In particular, a crab can be moved from a first box to a second box in order to protect the crab (e.g., provide a clean environment for the crab). For example, the system can be configured to allow the box body to be separated from the box base by disconnecting the box body connector. In this case, water can flow through the box base once the box body is removed, and the ball valve mechanism can continue to seal the water such that water does not exit the box body.

To replace the box body, the system is configured such that a new box body can be connected to the box base using the box body connector. In this case, the box base stand, the connector guide, and the guide spacer allow for proper alignment of the box body with the box base. By properly aligning the box body with the box base, the system can connect the box body and provide a clean box for the crustacean, which can aid in decreasing disease. In some cases, such as when the box body is not fully connected with the box base, the O ring of the seal can prevent water from leaking into the box through the box waste drain hole.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A device for aquaculture, the device comprising:
an aquaculture box configured to store water at a water storing stage when one or more crustaceans are being fed and to drain water and waste material at a water draining stage after feeding, the aquaculture box comprising a box body and a box base, the box body being releasably attached to the box base, the box body comprising an upper end opposite a lower end,
wherein the box body comprises:
a box surface drain hole connected to a box surface drain pipe positioned vertically inside the box body, wherein the box surface drain hole is configured to drain water out of the box body through the box surface drain pipe when a water level of water of the interior of the aquaculture box is higher than a height of the box surface drain hole,
a box waste drain hole different from the box surface drain hole, the box waste drain hole configured to drain both water and waste material from the box body, wherein water drained out of the box surface drain hole is separate from water drained out of the box waste drain hole; and
a box body connector located below the box waste drain hole at the lower end;
wherein the box base comprises:
a valve configured to connect to the box waste drain hole through the box body connector when the box body is attached to the box base,
wherein the valve comprises:
a box waste drain pipe positioned below the box waste drain hole, wherein the box waste drain pipe is configured to store water during the water storing stage when the crustaceans are being fed and to drain both water and waste material from the aquaculture box during the water draining stage after feeding,
a buoyant ball movable between the box waste drain hole and the box waste drain pipe, wherein the buoyant ball is configured to float up towards the box waste drain hole and seal the box waste drain hole on the box body to prevent water from flowing out of the aquaculture box during the water storing stage, wherein a diameter of the box waste drain hole on the aquaculture box is smaller than a diameter of the buoyant ball, and wherein the buoyant ball is configured to drop down towards the box waste drain pipe when the box waste drain pipe drains water and waste material from the aquaculture box during the water draining stage, and
a ball block comprising an angled ridge protruding from the box base, the ball block being configured to prevent the buoyant ball from sealing the box waste drain pipe and allow water and waste material to flow down to the box waste drain pipe during the water draining stage,
wherein the box body connector comprises a connector guide that ensures the box body is aligned with the box base when the box body is attached to the box base, and
wherein the aquaculture box is connected to a closed aquaculture system for harvesting crustaceans, wherein after water is introduced to the closed aquaculture system through an input water pipe, water is retained in the box waste drain pipe and allows the buoyant ball to float up towards the box waste drain hole, and wherein upon cleaning, the closed aquaculture system releases water out of the box waste drain pipe, allowing the buoyant ball to drop down.

2. The device of claim 1, wherein the buoyant ball seals the box waste drain hole at the water storing stage based on a water level of water drained from another aquaculture box at the water draining stage of the other aquaculture box.

3. The device of claim 1, wherein the lower end is smaller than the upper end, and wherein the upper end and the lower end are connected by at least one inclined angle configured to drain water at the lowest end at the water draining stage.

4. The device of claim 1, wherein the one or more crustaceans include a crab, and wherein food is supplied to the crab after the water storing stage and prior to the water draining stage.

5. The device of claim 1, wherein the aquaculture box further comprises:
a box cover configured to cover the upper end of the box body; and
a cover lock configured to (i) connect the box cover to the box body, and (ii) prevent the box cover from being opened from an inside of the box body.

6. The device of claim 1, further comprising:
a ball seal located between the box waste drain hole and the buoyant ball and configured to further enable sealing the box waste drain hole.

7. A system for aquaculture, the system comprising:
a plurality of devices, each device comprising:
an aquaculture box configured to store water at a water storing stage when one or more crustaceans are being fed and to drain water and waste material at a water draining stage after feeding, the aquaculture box comprising a box body and a box base, the box body being releasably attached to the box base, the box body comprising an upper end opposite a lower end, wherein the box body comprises:
a box surface drain hole connected to a box surface drain pipe positioned vertically inside the box body, wherein the box surface drain hole is configured to drain water out of the box body through the box surface drain pipe when a water level of water of the interior of the aquaculture box is higher than a height of the box surface drain hole,
a box waste drain hole different from the box surface drain hole, the box waste drain hole configured to drain both water and waste material from the aquaculture-box body, wherein water drained out of the box surface drain hole is separate from water drained out of the box waste drain hole; and
a box body connector located below the box waste drain hole;
wherein the box base comprises:
a valve configured to connect to the box waste drain hole through the box body connector when the box body is attached to the box base,
wherein the valve comprises:
a box waste drain pipe positioned below the box waste drain hole, wherein the box waste drain pipe is configured to store water during the water storing stage when the crustaceans are being fed and to drain both water and waste material from the aquaculture box during the water draining stage after feeding,
a buoyant ball movable between the box waste drain hole and the box waste drain pipe, wherein the buoyant ball is configured to move float up towards the box waste drain hole and seal the box waste drain hole on the box body to prevent water from flowing out of the aquaculture box during the water storing stage, wherein a diameter of the box waste drain hole on the aquaculture box is smaller than a diameter of the buoyant ball and wherein the buoyant ball is configured to drop down towards the box waste drain pipe when the box waste drain pipe drains water and waste material from the aquaculture box during the water draining stage, and
a ball block comprising an angled ridge protruding from the box base, the ball block being configured to prevent the buoyant ball from sealing the box waste drain pipe and allow water and waste material to flow down to the box waste drain pipe during the water draining stage,
wherein the box body connector comprises a connector guide that ensures the box body is aligned with the box base when the box body is attached to the box base;
a plurality of water delivery pipes configured to deliver water from an input water pipe to each of the plurality of devices; and
a plurality of water collection pipes configured to collect water from each of the plurality of devices,
wherein each aquaculture box is connected to a closed aquaculture system for harvesting crustaceans, wherein after water is introduced to the closed aquaculture system through the input water pipe, water is retained in each box waste drain pipe and allows each buoyant ball to float up towards the corresponding box waste drain hole, and wherein upon cleaning, the closed aquaculture system releases water out of each box waste drain pipe, allowing each buoyant ball to drop down.

8. The system of claim 7, wherein the system further comprises a waste drain pipe configured to collect water from the water collection pipes, wherein a set of water collection pipes of the plurality of water collection pipes is connected to the waste drain pipe by one or more connectors.

9. The system of claim 7, wherein the system further comprises a surface drain pipe configured to collect excess water from the water collection pipes, wherein a second set of water collection pipes of the plurality of water collection pipes is connected to the surface drain pipe by one or more connectors.

10. The system of claim 9, wherein the surface drain pipe is further configured to collect excess water from the water collection pipes based on the positive pressure of the box body of each of the aquaculture boxes.

11. The system of claim 7, wherein the plurality of devices are arranged in one or more rows.

12. The system of claim 7, wherein the buoyant ball seals the first box waste drain hole at the water storing stage based on a water level of water drained from another aquaculture box to the box waste drain pipe.

13. The system of claim 7, wherein the crustacean is a crab, and wherein food is supplied to the crab after the water storing stage and prior to the water draining stage.

* * * * *